United States Patent
Bragstad et al.

(10) Patent No.: US 10,057,332 B2
(45) Date of Patent: Aug. 21, 2018

(54) PREEMPTIVE EXTRACTION OF DATA FROM LONG LATENCY STORAGE IN A CLOUD COMPUTING ENVIRONMENT

(71) Applicant: International Business Machines Corporation, Armonk, NY (US)

(72) Inventors: Lance Bragstad, Pine Island, MN (US); Michael J. Fork, Gibsonburg, OH (US); Mathew R. Odden, Rochester, MN (US); Adam D. Reznechek, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 14/567,441

(22) Filed: Dec. 11, 2014

(65) Prior Publication Data

US 2016/0173409 A1 Jun. 16, 2016

(51) Int. Cl.
*H04L 29/08* (2006.01)
*H04L 12/911* (2013.01)
*G06F 5/00* (2006.01)

(52) U.S. Cl.
CPC ............ *H04L 67/10* (2013.01); *G06F 5/00* (2013.01); *H04L 47/78* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 8,037,502 B1 * | 10/2011 | Kim | H04N 7/17336 725/87 |
| 8,566,788 B2 | 10/2013 | Snodgrass et al. | |
| 9,443,088 B1 * | 9/2016 | Bye | G06F 21/57 |
| 2002/0169828 A1 * | 11/2002 | Blanchard | G06F 17/30902 709/203 |
| 2013/0179577 A1 * | 7/2013 | Singh | H04L 65/60 709/226 |
| 2015/0339156 A1 * | 11/2015 | Vincent | G06F 9/4856 718/1 |

OTHER PUBLICATIONS

Bragstad et al., "Preemptive Extraction of Data From Long Latency Storage in a Cloud Computing Environment" U.S. Appl. No. 14/571,239, filed Dec. 15, 2014.
List of IBM Patents or Patent Applications Treated as Related.
Kroeger et al., "Design and Implementatin of a Predictive File Prefetching Algorithm," Proceedings of the 2001 USENIX Annual Technical Conference, Jun. 25-30, 2001.
Griffioen et al., "Reducing File System Latency using a Predictive Approach," Department of Computer Science, University of Kentucky, 1994.
U.S. Appl. No. 14/571,239, filed Dec. 15, 2014.

* cited by examiner

*Primary Examiner* — Angela Nguyen
(74) *Attorney, Agent, or Firm* — Martin & Associates, LLC; Bret J. Petersen

(57) ABSTRACT

A resource utilization mechanism (RUM) preemptively extracts data from long latency storage in a cloud computing environment to economically and quickly provide data that is infrequently accessed by customers. The RUM identifies periods of low resource utilization where capacity can be efficiently utilized, identifies data to be retrieved, and retrieves the data from long latency storage to make it available to the customer. The RUM may notify a customer that the data is available and allow the customer to accept terms of use for the data or opt out of using the data.

12 Claims, 7 Drawing Sheets

PREEMPTIVE EXTRACTION OF DATA FROM LONG LATENCY STORAGE IN A CLOUD COMPUTING ENVIRONMENT

BACKGROUND

1. Technical Field

This invention generally relates to cloud computing systems, and more specifically relates to preemptive extraction of data from long latency storage in a cloud computing environment to economically provide data to customers that is infrequently accessed.

2. Background Art

Cloud computing is a common expression for distributed computing over a network and can also be used with reference to network-based services such as Infrastructure as a Service (IaaS). IaaS is a cloud based service that provides physical processing resources to run virtual machines (VMs) as a guest for different customers. The virtual machine may host a user application or a server.

In cloud computing environments, service providers provide data storage services that are optimized for data that is infrequently accessed. This data storage is sometimes referred to as long latency storage, and the data may be referred to as long latency data. The retrieval times of this infrequently accessed data or long latency data may be several minutes or several hours. Thus when a customer has long latency data stored in a service provider's data center and wants to retrieve and/or process the data, the customer's data may take a long time to retrieve. The long latency data may be stored in hosting machines that are powered off and need to be brought online in order to retrieve the data. While data stored in this manner may be less expensive than having a large amount of data stored in low latency storage, the customer usually must pay a premium each time the service provider retrieves long latency data due to the costs of powering on additional resources in the data center and utilizes processing and network resources.

BRIEF SUMMARY

An apparatus and method preemptively extract data from long latency storage in a cloud computing environment and place it in low latency storage to economically and quickly provide data that is infrequently accessed by customers before it is requested by the customer. A resource utilization mechanism (RUM) identifies periods of low resource utilization where capacity can be efficiently utilized, identifies data to be retrieved, and retrieves the data from long latency storage to make it available to the customer. The RUM may notify a customer that the data is available and allow the customer to accept terms of use for the data or opt out of using the data.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
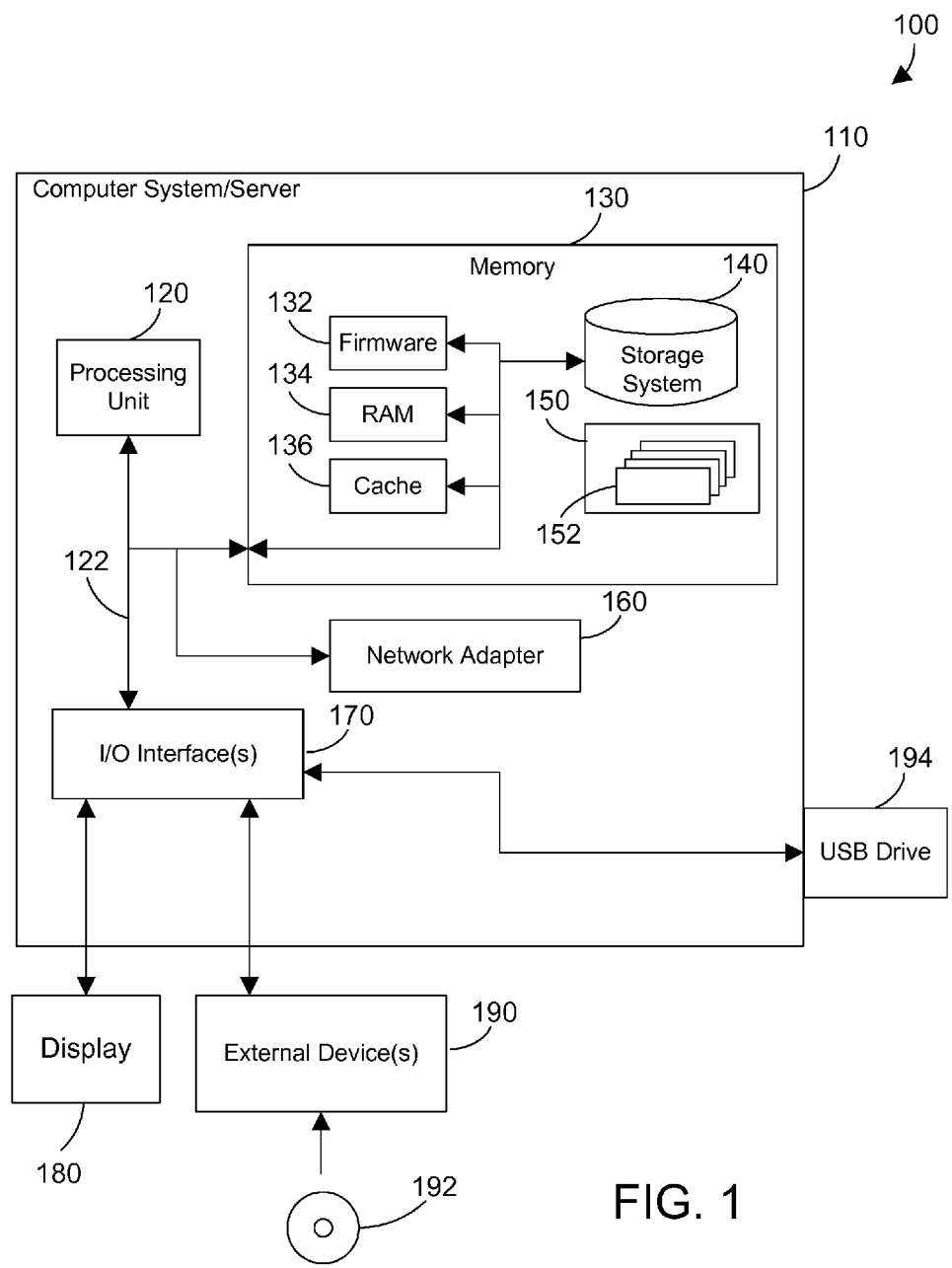
FIG. 1 is a block diagram of a cloud computing node.

The claims and disclosure herein provide mechanisms and methods for preemptively extracting data from long latency storage in a cloud computing environment and placing it in low latency storage to economically provide data that is infrequently accessed by customers before it is requested by the customer. A resource utilization mechanism (RUM) identifies periods of low resource utilization where capacity can be efficiently utilized, identifies data to be retrieved, and retrieves the data from long latency storage to make it available to the customer. The RUM may notify a customer that the data is available and allow the customer to accept terms of use for the data or opt out of using the data.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. Examples of removable media are shown in FIG. 1 to include a Digital Video Disc (DVD) 192 and a USB drive 194.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. One suitable example of an external device 190 is a DVD drive which can read a DVD 192 as shown in FIG. 1. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
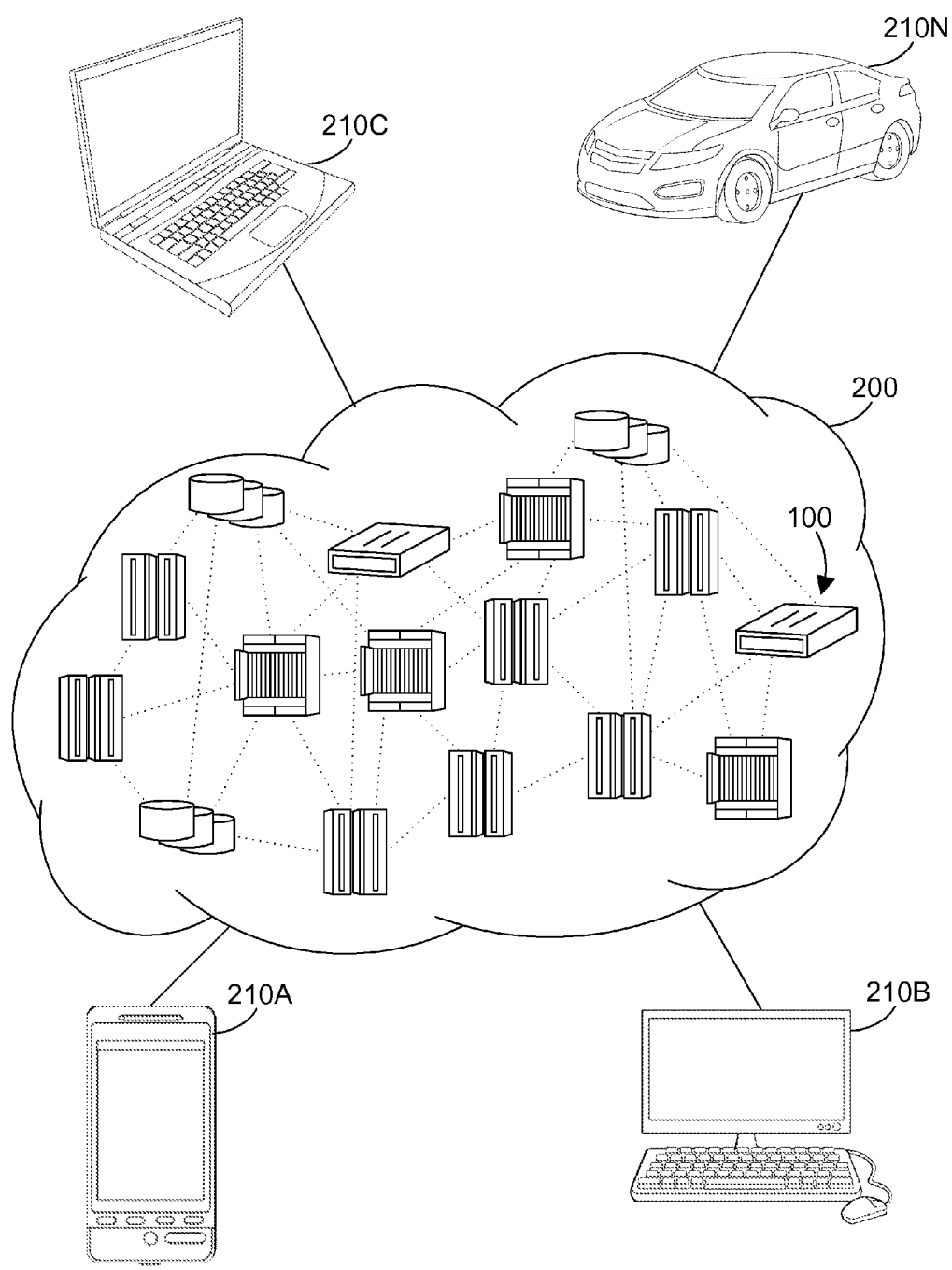
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
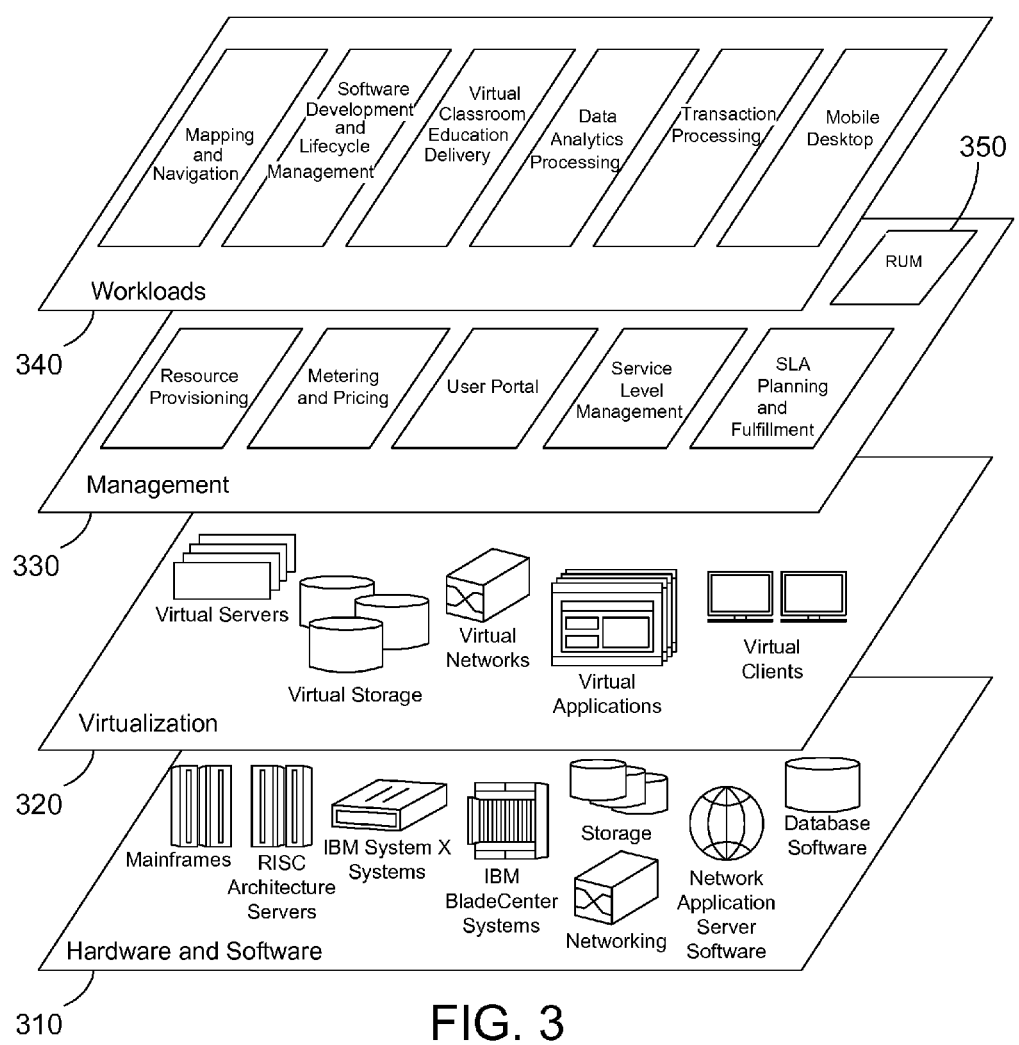
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. The management layer further includes a resource utilization mechanism (RUM) 350 as described herein. While the RUM 350 is shown in FIG. 3 to reside in the management layer 330, the RUM 350 actually may span other levels shown in FIG. 3 as needed.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing and mobile desktop.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As introduced above, when a customer has long latency data stored in a service provider's data center and wants to retrieve and/or process the data, the customer's data may take a long time to retrieve. The long latency data may be stored in hosting machines that are powered off and need to be brought online in order to retrieve the data. The hosting machines in the cloud may have excess capacity available at various times. The excess capacity of the resources will vary over time and is sometimes offered to customers at lower priced spot pricing. The disclosure and claims herein described a method and apparatus for a service provider to use excess capacity of the resources to preemptively load a customer's data. The service provider is then able to offer previously long latency data to the customer with no retrieval times and offer incentives to use it for data processing. This allows the service provider to better monetize previously unutilized or under-utilized cloud resources.

Figure 4:
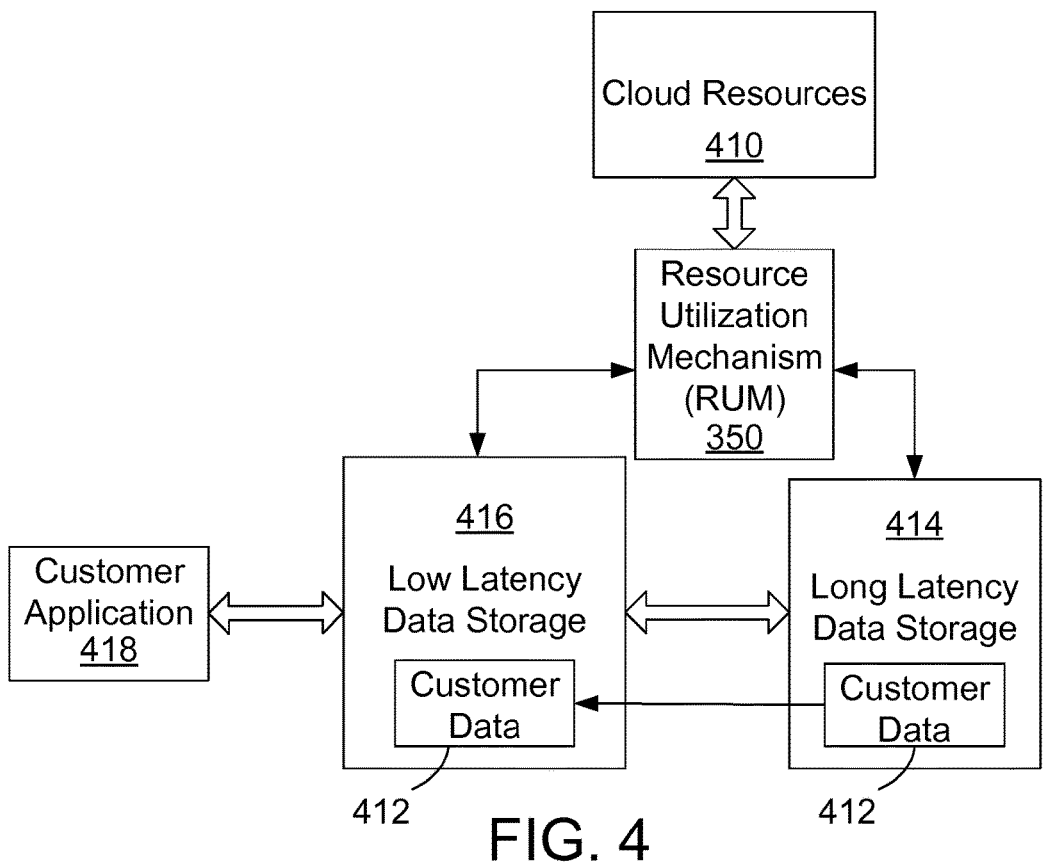
FIG. 4 is a block diagram that illustrates a resource utilization mechanism that provides data from long latency data storage to a customer application as described herein.

Referring now to FIG. 4, a block diagram illustrates preemptive extraction of data from long latency storage in a cloud computing environment to economically and quickly provide data from long latency storage by a customer application by using periods of low utilization of resources. A resource utilization mechanism (RUM) 350 monitors cloud resources 410 to determine periods of low utilization of cloud resources. The resource utilization mechanism 350 identifies customer data 412 in long latency data storage 414 and uses periods of low utilization of resources to make the data available from low latency storage 416 to a customer application 418. The RUM 350 is a software entity that typically resides in the management layer 330 as described above with reference to FIG. 3. The RUM monitors cloud resources for low utilization periods on the hardware and software layer 310 also shown in FIG. 3. The RUM may use any suitable method for monitoring cloud resources. There are many software monitoring solutions available in the prior art. These solutions typically gather information through service agents placed on the hardware resources that periodically send information to a central storage location. The RUM could request information from such a service periodically or our RUM could gather information itself in a similar manner. The long latency data storage 414 may include offline disk storage, offline virtual machines, or other long latency storage on the hardware and software layer 310 in FIG. 3. The low latency data storage 416 may include disk storage, memory storage, or other low latency storage on the hardware and software layer 310 in FIG. 3. The customer application 418 is customer software that represents one of the workloads on the workloads layer 340 shown in FIG. 3.

As described above, the resource utilization mechanism (RUM) 350 monitors cloud resources 410 to determine periods of low utilization of cloud resources. The resources that are monitored include processing power to operate on data and retrieval capacity of long latency data from long latency data storage or a long-term storage facility. Thus the resources may include central processor utilization, disk utilization and network utilization. In an example for monitoring cloud resources, the RUM tracks and records resource usage in the cloud, analyzes resource usage and predicts future low utilization of cloud resources based on the recorded historic usage. The RUM can use historic usage information from the history of the user/accounts usage of resources, and also the history of usage in the overall cloud/cluster. Cross-referencing both of the historic patterns would show where the RUM could optimally fit the user's periodic usage into the overall cloud usage. The RUM could also use current usage instead of historic usage. For example, if the cloud resource load is abnormally low the RUM could provide an incentivized opportunity to one or more customers to use the under-utilized resources.

As described above, the resource utilization mechanism (RUM) 350 identifies data that can be retrieved from long latency storage. A first example of identifying data involves input from the customer. The customer is allowed to provide a data pre-order message that indicates potential future data needs of the customer. The RUM considers the data pre-order message sent from the customer application to identify data to preemptively retrieve from long latency storage. The data pre-order message may be automatically generated by the customer application and may include manual input from a customer user such as through a user interface. The pre-order message could indicate what data items are needed, a priority and may also include a time frame when the data is needed.

A second example of how to identify data to be retrieved from long latency storage is to analyze a customer's historical access patterns to predict data that may be needed or desired by the customer in the future. Further, analyzing a customer's historical access patterns can be used in conjunction with the data pre-order to determine when and what data to offer the customer using resources during times of low utilization as described herein. In addition, the RUM could optionally cross-reference the user historical usage with the cloud provider historical load usage to determine an optimal point in the future to suggest a data pre-order. Alternatively, if there is a current or a standing pre-order, the RUM could assemble a counter-offer at a lower cost to the user and at a more optimal time for the cloud provider that the user could accept or deny. Further, if the user already has a pre-order matching or similar to their historic usage, the RUM could safely assume there is no need to generate any more suggestions for pre-orders to the user.

Figure 5:
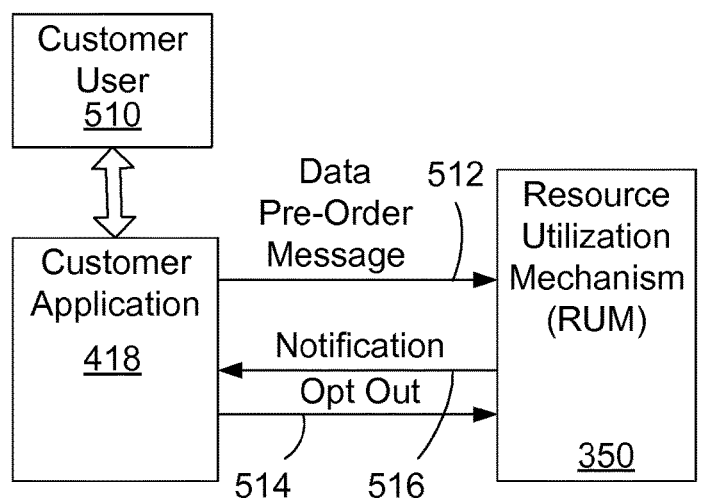
FIG. 5 is a block diagram that illustrates a customer's interaction with the resource utilization mechanism as described herein.

Referring now to FIG. 5, a block diagram illustrates one example of the RUM providing data retrieved from long latency storage. As described above with reference to FIG. 4, the resource utilization mechanism 350 identifies customer data 412 in long latency data storage 414 and makes it available in low latency storage 416 to a customer application 418. FIG. 5 illustrates interaction between the resource utilization mechanism 350 and the customer application 418 to make the data available. In this example, the customer 510 through the customer application 418 provides a data pre-order that indicates what data will likely be needed at some future time. The RUM determines from the data pre-order 512 and may also use the customer's historic data usage to determine what data to offer to the customer. The customer application 418 is notified 516 that the requested data is available. The notification may optionally include details on financial discounts being offered in conjunction of accessing and using the data (i.e., free retrieval, discounted processor time, etc.). The customer application is given the opportunity to opt-out 514 of the pre-emptive load because it is not needed or would go unused. The notification 516 to the customer application can optionally be relayed to the customer user 510. Thus an administrator or user of the customer can make the decision to accept or opt out of using the data. How to generate and deliver notifications is known in the prior art. Notifications could take the form of e-mail, text message, push notification, etc.

Figure 6:
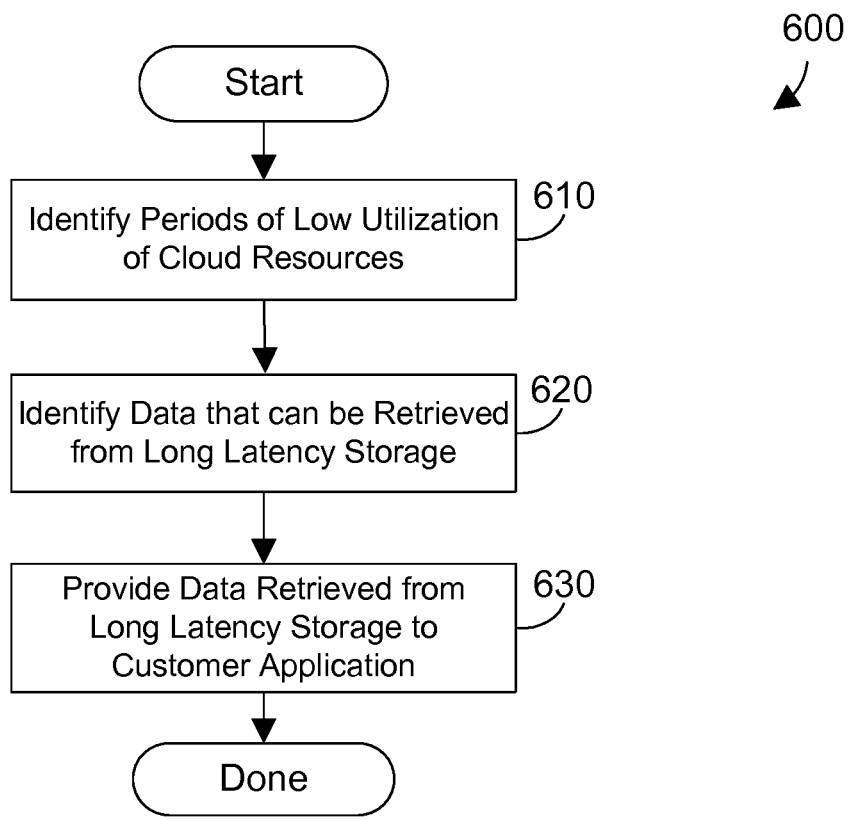
FIG. 6 is a flow diagram of a method for a resource utilization mechanism to preemptively extract data from long latency storage in a cloud computing environment.

FIG. 6 illustrates a flow diagram of a method 600 for preemptively extracting data from long latency storage in a cloud computing environment. The method 600 is presented as a series of steps performed by a computer software program such as the resource utilization mechanism 350 described above. Identify periods of low utilization of cloud resources (step 610). Identify data that can be retrieved from long latency storage (step 620). Provide data retrieved from long latency storage to a customer application (step 630). The method is then done.

Figure 7:
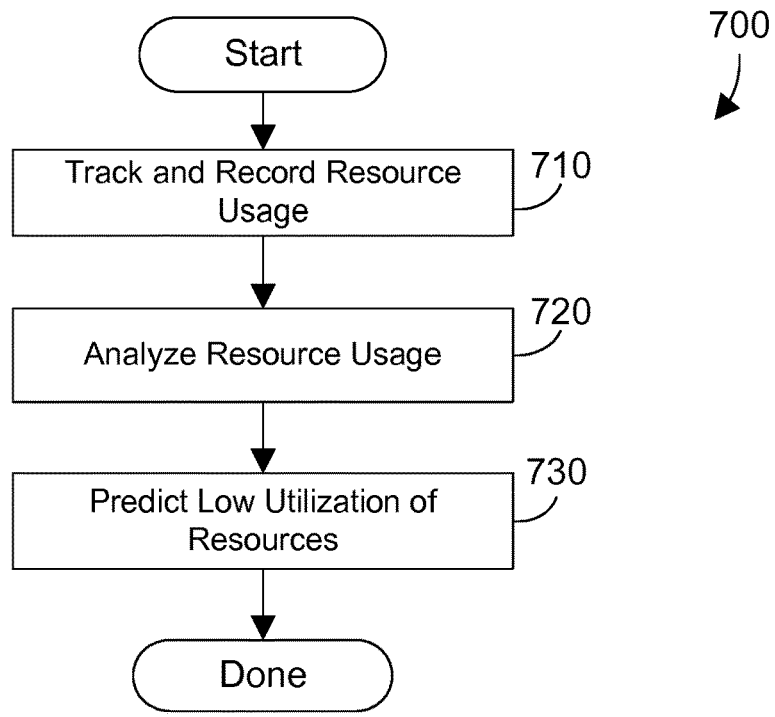
FIG. 7 is a flow diagram of an example method for step 610 in FIG. 6.

Referring now to FIG. 7, a flow diagram shows method 700 that is an exemplary method for performing step 610 in method 600. The method 700 is presented as a series of steps performed by a computer software program described above as the resource utilization mechanism 350. First, track and record resource usage in the cloud (step 710). Analyze resource usage (step 720). Predict low utilization of cloud resources (step 730). The method is then done.

Figure 8:
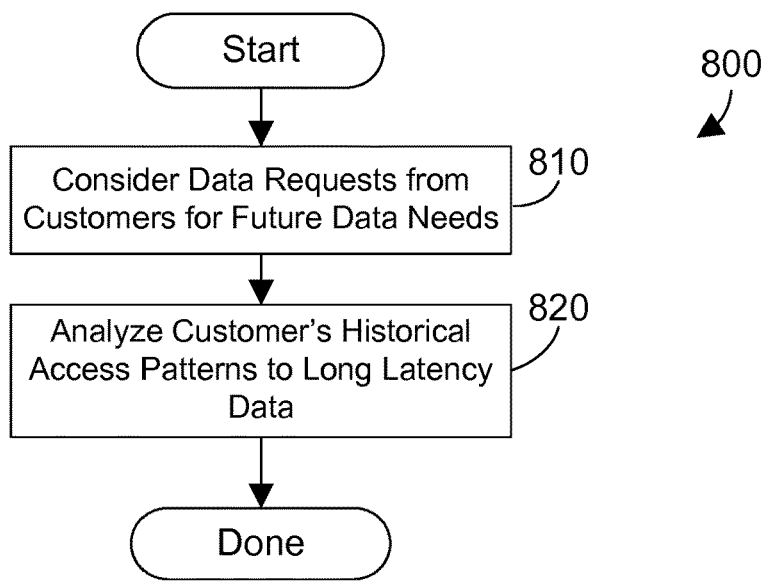
FIG. 8 is a flow diagram of an example method for step 620 in FIG. 6.

Referring now to FIG. 8, a flow diagram shows method 800 that is an exemplary method for performing step 620 in method 600. The method 800 is presented as a series of steps performed by a computer software program described above as the resource utilization mechanism 350. First, consider data requests from a customer for future data needs from long latency storage (step 810). Analyze customer's historical access patterns to long latency data (step 820). The method is then done.

Figure 9:
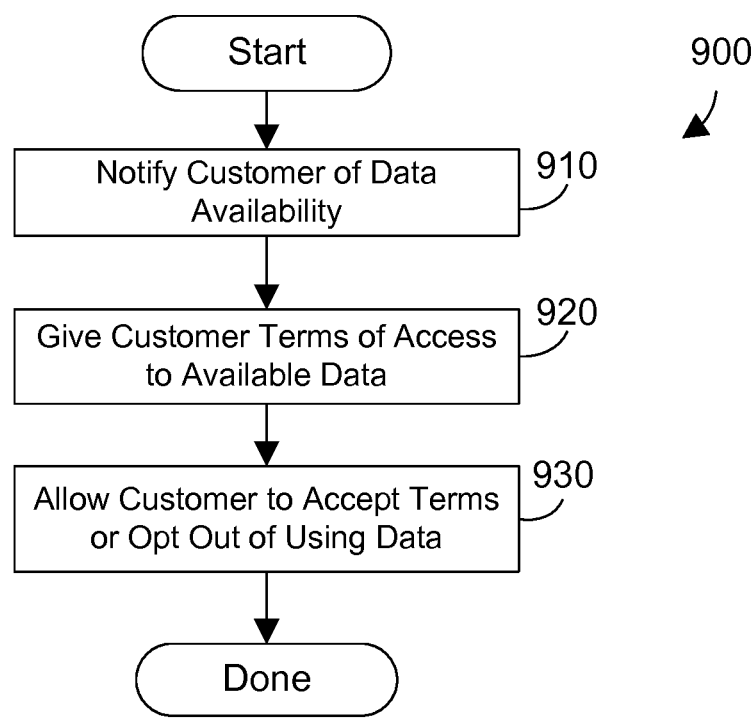
FIG. 9 is a flow diagram of a method for step 630 in FIG. 6.

Referring now to FIG. 9, a flow diagram shows method 900 that is an exemplary method for performing step 630 in method 600. The method 900 is presented as a series of steps performed by a computer software program described above as the resource utilization mechanism 350. First, notify a user of availability of long latency data (step 910). Give customer terms of access to the available long latency data (step 920). Allow the customer to accept the terms of access or opt out of using the available long latency data (step 830). The method is then done.

The claims and disclosure herein provide an apparatus and method for preemptively extracting data from long latency storage in a cloud computing environment to more economically use cloud resources by moving data from long latency storage to low latency storage during times of low utilization of resources.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for preemptively extracting data from long latency storage and placing the preemptively extracted data in low latency storage to provide infrequently accessed data to a customer application, the method comprises:
   identifying periods of low utilization of cloud resources where excess capacity can be efficiently utilized;
   identifying data of a customer's data stored on cloud resources to be preemptively retrieved from the long latency storage; and
   retrieving the data from the long latency storage located in offline storage in a service provider's data center and moving it prior to a request for the data from the customer application to the low latency storage in online disk storage also located in the service provider's data center;
   providing the data moved to low latency storage to the customer application located on the cloud resources.

2. The method of claim 1 wherein the low utilization of cloud resources includes central processor utilization, disk utilization and network utilization.

3. The method of claim 1 wherein identifying periods of low utilization of cloud resources further comprises:
   tracking and recording resource usage;
   analyzing resource usage; and
   predicting periods of low utilization of resources.

4. The method of claim 1 wherein identifying data to be preemptively retrieved from long latency storage further comprises considering data requests from the customer application for future needs.

5. The method of claim 1 wherein identifying data to be preemptively retrieved further comprises analyzing access patterns by the customer application to long latency data and cross referencing history of usage of the overall cloud to find an optimal time to fit the user's periodic usage into the overall cloud usage.

6. The method of claim 1 wherein making the long latency data available to the customer further comprises:
   notifying the customer application of availability of the data;
   giving the customer application terms of access to the data; and
   allowing a user of the customer application to either accept the terms or opt out of using the data.

7. The method of claim 4 further comprising receiving a data pre-order message from the customer application that indicates what data items are needed, a priority and a time frame when the data is needed.

8. The method of claim 7 wherein the data pre-order message is manually provided by a user of the customer application.

9. A computer-implemented method executed by at least one processor for preemptively extracting data from long latency storage and placing the preemptively extracted data in low latency storage to provide infrequently accessed data to a customer application comprises:
   identifying periods of low utilization of cloud resources where excess capacity can be efficiently utilized by:
      tracking and recording resource usage;
      analyzing resource usage;
      predicting periods of low utilization of resources;
   identifying data of a customer's data stored on cloud resources to be preemptively retrieved from long latency storage in response to a data pre-order message from the customer application that indicates what data in long latency storage will likely be needed at a future time;
   retrieving the data from long latency storage located in offline storage in a service provider's data center and moving it to the low latency storage in online disk storage also located in the service provider's data center and making it available to the customer application prior to a request for the data from the customer application by:
      notifying the customer application of availability of the data;
      giving the customer application terms of access to the data; and
      allowing a user of the customer application to either accept the terms or opt out of using the data;
      providing the data moved to low latency storage to the customer application located on the cloud resources;
   wherein the low utilization of cloud resources includes central processor utilization, disk utilization and network utilization; and
   wherein identifying data to be preemptively retrieved further comprises analyzing access patterns by the customer application to long latency data and cross-referencing history of usage of the overall cloud to find an optimal time to fit the user's periodic usage into the overall cloud usage.

10. The method of claim 9 wherein considering data requests from the customer application for future needs further comprises receiving a data pre-order message from a customer application that is manually provided by a user of the customer application.

11. The method of claim 9 wherein identifying data to be preemptively retrieved further comprises analyzing customer access patterns to long latency data.

12. The method of claim 9 wherein the pre-order message indicates what data items are needed, a priority and a time frame when the data is needed.

* * * * *